H. L. MASON.
ELECTRICALLY CONTROLLED HOOD LOCK.
APPLICATION FILED JAN. 29, 1914. RENEWED FEB. 25, 1916.
1,199,199.
Patented Sept. 26, 1916.
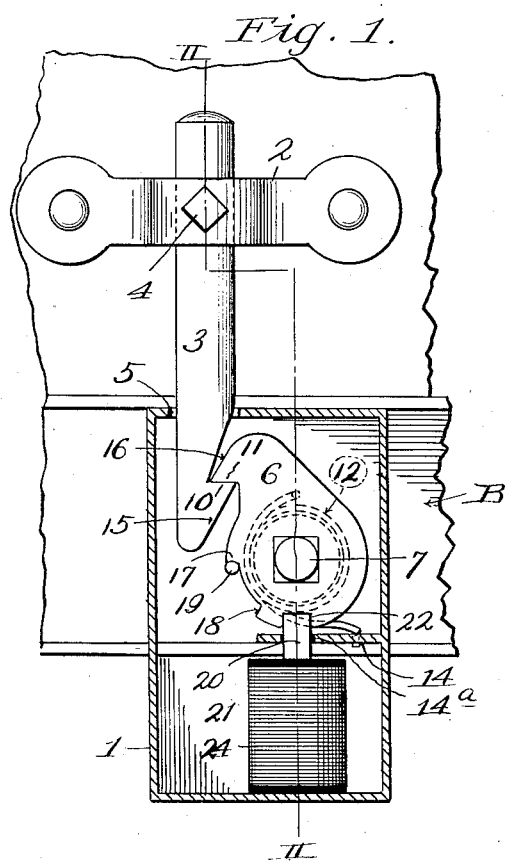
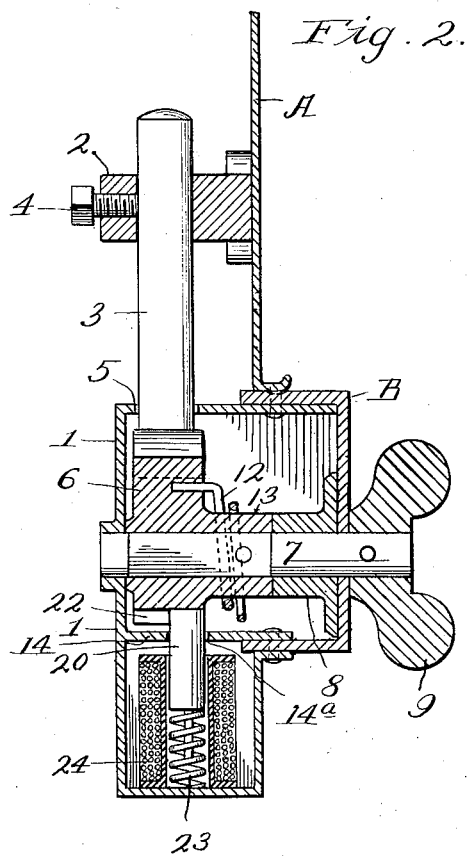
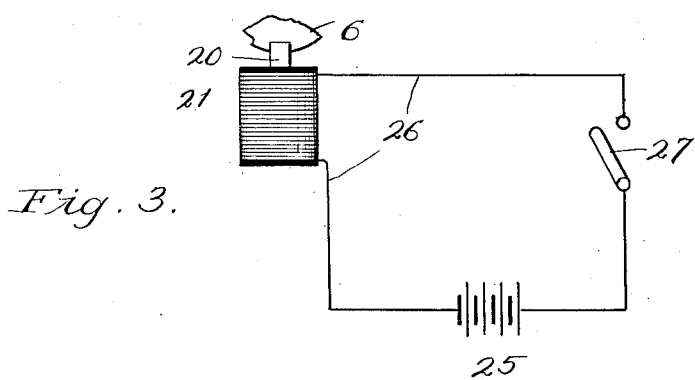
WITNESSES:
INVENTOR:
Howard L. Mason,
BY
ATTORNEY.

UNITED STATES PATENT OFFICE.

HOWARD L. MASON, OF KANSAS CITY, MISSOURI, ASSIGNOR TO THE UNIVERSAL SAFETY LOCK COMPANY, A CORPORATION OF ILLINOIS.

ELECTRICALLY-CONTROLLED HOOD-LOCK.

1,199,199.  Specification of Letters Patent.  Patented Sept. 26, 1916.

Application filed January 29, 1914, Serial No. 815,159. Renewed February 25, 1916. Serial No. 80,554.

*To all whom it may concern:*

Be it known that I, HOWARD L. MASON, a citizen of the United States, residing at Kansas City, in the county of Jackson and State of Missouri, have invented certain new and useful Improvements in Electrically-Controlled Hood-Locks, of which the following is a specification.

My invention relates to electrically-controlled locks, and it is particularly adapted to the locking of an automobile hood, so that access cannot be gained to the automobile ignition system for the purpose of starting the automobile during the absence of the owner.

In order that the invention may be fully understood, reference will now be made to the accompanying drawing, in which:

Figure 1 is a side elevation partly in section of the lock in position on an automobile. Fig. 2 is an irregular vertical section on line II—II of Fig. 1. Fig. 3 is a diagram of the electric circuit for controlling the lock.

A designates a broken portion of a hood of the type hinged at the top.

B designates a portion of the chassis upon which the hood A rests when closed.

1 designates the case for my lock, said case being secured to the inner side of the member B of the chassis.

2 designates a lug rigidly secured to the inner side of the hood A.

3 designates a bolt adjustably extending through an opening in lug 2 and secured at any point of its adjustment by a set-screw 4. An opening 5 is provided in the top of case 1 to permit the lower portion of the bolt 3 to enter said case when the hood is closed.

6 designates a latch mounted in the upper portion of case 1 upon the rectangular portion of a shaft 7, journaled in one side of the case and a bearing 8 secured to the interior of said case. One end of shaft 7 projects from the case 1 and is provided with a knob 9, whereby the shaft 7 may be rocked to disengage the latch 6 from the bolt 3.

Bolt 3 has a shoulder 10 for engagement with a corresponding shoulder 11 at the upper portion of the latch 6, which is automatically rocked into engagement with said bolt by a coil spring 12. Spring 12 loosely embraces a hub 13 of the latch 6 to which one of its ends is secured, the opposite end of said spring being secured to a partition 14 dividing the upper and lower portions of the case 1.

The lower end of bolt 3 has a beveled side 15 which contacts a correspondingly beveled side 16 at the upper end of the latch and rocks the latter back against the action of the spring 12 to allow the bolt 3 to pass down to the position shown on Fig. 1, after which the latch is immediately rocked forward by said spring until the shoulder 11 engages the shoulder 10.

The rocking movement of the latch 6 is restricted by shoulders 17, 18, contacting a stop-pin 19 on the interior of the case 1.

When the latch 6 is in engagement with the bolt 3 as disclosed by Fig. 1, it is locked in such engagement by the armature 20 of a solenoid 21 entering a notch 22 in the lower end of said latch 6. Armature 20 passes through an opening $14^a$ in the partition 14, which acts as a guide for said armature. The armature 20 is automatically forced into the notch 22 by a nonmagnetic spring 23, arranged in the hollow core of the solenoid magnet 24.

The solenoid 21 is in a circuit consisting of a battery 25, wires 26, and a manually-controlled switch 27. Switch 27 may be concealed about the automobile at a place known only to the owner, or said switch may be controlled by a combination lock, so that it cannot be closed without first solving the combination.

Normally the hood A cannot be raised owing to the engagement of bolt 3 with latch 6, and of latch 6 with the armature 20, but should the owner desire to raise the hood he can readily unlock the same on closing switch 27, which in turn closes the battery circuit, energizing the solenoid which attracts its armature 20 out of engagement with the notch 22, thus leaving said latch free to be rocked out of engagement with the bolt.

If the hood consists of two hinged sections, a lock is provided for each section.

Having thus described my invention, what I claim and desire to secure by Letters Patent is:

1. In combination with a member to be locked and an element to be locked thereto, a bolt secured to said element, a casing secured to the member and provided with an opening to receive the bolt, a rock-shaft mounted in said casing and projecting from one side thereof, a knob on the projecting end of said rock-shaft, a latch fixedly-mounted upon said rock-shaft and adapted to engage the bolt, a spring to force the latch into engagement with the bolt, a solenoid having an armature to engage the latch and hold the same in engagement with the bolt, and resilient means to force said armature into engagement with the latch.

2. In combination with a member to be locked and an element to be locked thereto, a lug secured to the inner side of the element, a vertically arranged bolt mounted in said lug, a casing secured to the member and having an opening in its upper wall for the passage of the lower end of the bolt, a rock shaft mounted in the casing and projecting from one side thereof, a knob on the projecting end of said rock shaft, a latch fixedly mounted upon the inner end of said rock shaft and adapted to engage the bolt, said latch having a marginal recess therein, a stop carried by the casing and extending into the recess to limit the movement of the latch, said latch also having a marginal notch, a spring to force the latch into engagement with the bolt, a solenoid in the casing having an armature to enter the notch in the latch, and a spring arranged in the coil of the solenoid to force the armature into the notch in the latch, substantially as shown and described.

In testimony whereof I affix my signature, in the presence of two witnesses.

HOWARD L. MASON.

Witnesses:
F. G. FISCHER,
R. E. HAMILTON.